United States Patent [19]
Vialatte

[11] 4,218,640
[45] Aug. 19, 1980

[54] TACHOMETRIC MEASURING DEVICE FOR DIRECT-CURRENT MOTORS, AND MOTOR EQUIPPED WITH SUCH A DEVICE

[75] Inventor: Claude Vialatte, Paris, France

[73] Assignee: Thomson-CSF, Paris, France

[21] Appl. No.: 941,581

[22] Filed: Sep. 12, 1978

[30] Foreign Application Priority Data

Sep. 16, 1977 [FR] France ............................ 77 28071

[51] Int. Cl.$^2$ ............................................. H02P 5/16
[52] U.S. Cl. .................................... 318/331; 310/68 C;
318/334; 318/473
[58] Field of Search ............... 318/331, 334, 471, 472, 318/473; 361/25; 310/68 C

[56] References Cited

U.S. PATENT DOCUMENTS

| 2,619,573 | 11/1952 | Dawson, Jr. ......................... 310/68 C |
| 2,717,945 | 9/1955 | Dresios et al. ......................... 310/680 |
| 3,219,856 | 11/1965 | Dunwiddie et al. ................... 361/25 |
| 3,422,313 | 1/1969 | Snoberger et al. ...................... 361/25 |
| 3,458,155 | 7/1969 | Planteisdt ................................ 318/6 |
| 3,568,027 | 3/1971 | Bacon ................................... 318/331 |
| 3,705,337 | 12/1972 | Grabl ................................... 318/331 |
| 4,145,642 | 3/1979 | Kosaka et al. ......................... 318/331 |

Primary Examiner—David Smith, Jr.
Attorney, Agent, or Firm—Cushman, Darby & Cushman

[57] ABSTRACT

A stationary device for sensing the rotational speed of electric motors, comprising an impedance bridge circuit, the motor being inserted into one branch of the bridge in series with a resistive element, and a voltage proportional to the rotational speed being derived across a diagonal of the bridge, the resistive element being a winding wound directly on to the motor, in order to make it isothermic, and insensitive to the magnetic field of said motor by a form of winding of the "two wires in hand" type.

8 Claims, 6 Drawing Figures

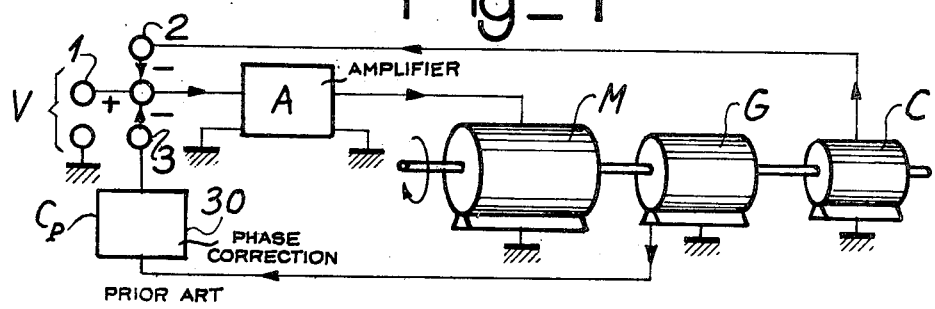
Fig_1
PRIOR ART
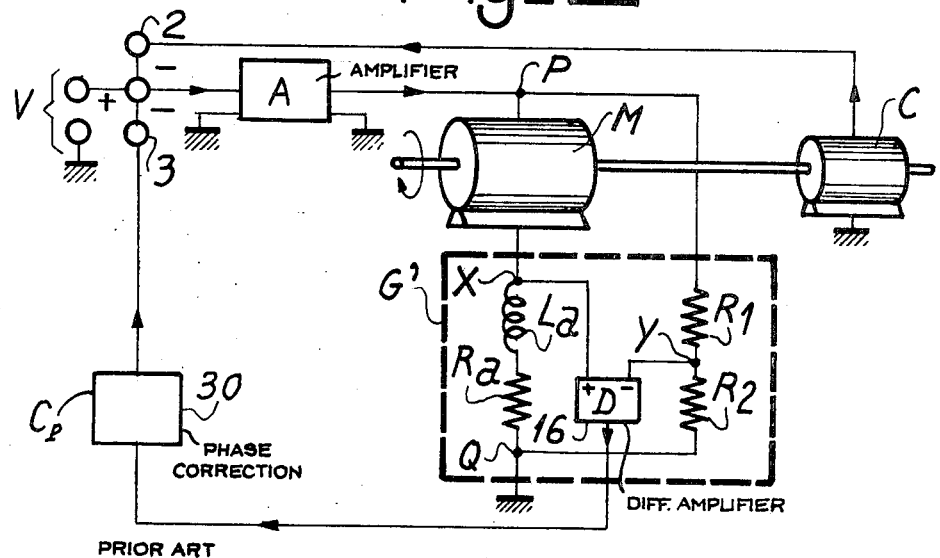
Fig_2
PRIOR ART
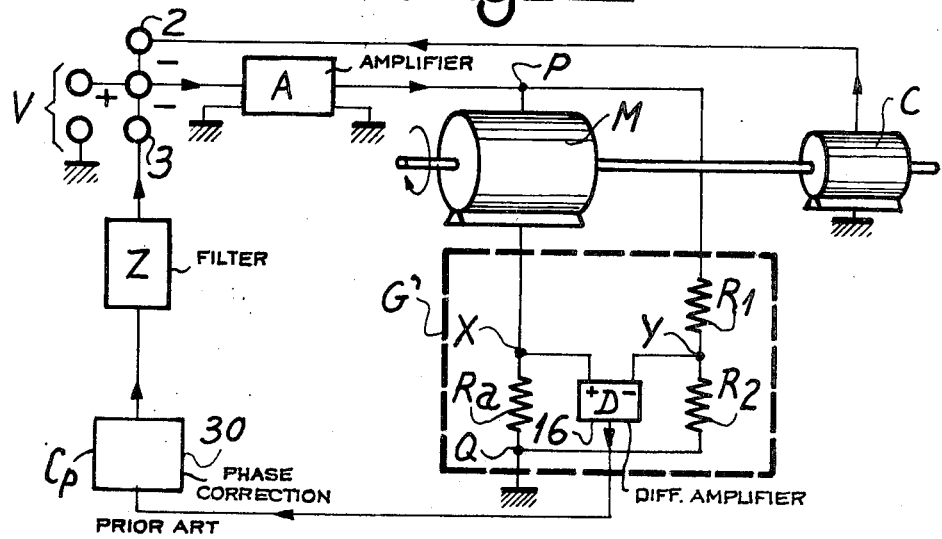
Fig_3
PRIOR ART

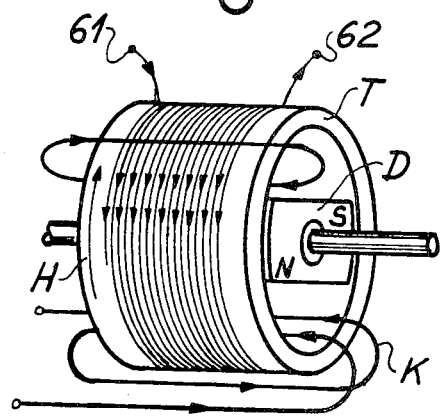
Fig_4
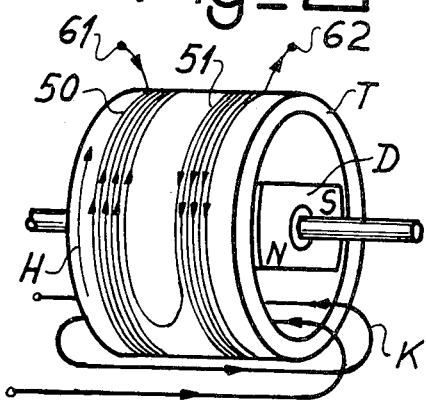
Fig_5
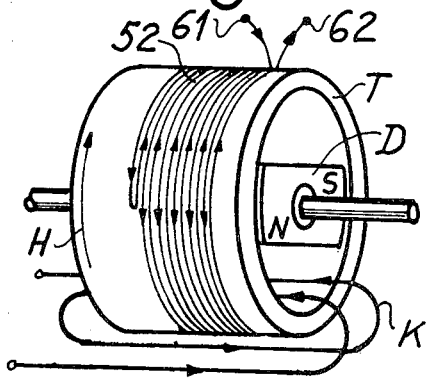
Fig_6

TACHOMETRIC MEASURING DEVICE FOR DIRECT-CURRENT MOTORS, AND MOTOR EQUIPPED WITH SUCH A DEVICE

The present invention relates to the field of positional servo-control devices for direct-current electric motors.

These devices make use, for the electrical supply of such motors, of a power amplifier, controlled by an input signal, to which the required servo-control signal is applied in parallel from a pick-up sensor, sensitive to the position of the rotating part of the motor.

In order to increase the positional accuracy, an additional device which takes into account the speed of displacement is frequently also used, leading to a tachometrically corrected positional servo-control device. The additional element for creating an electrical signal linked to the speed, most often takes the form of a rotating machine designated by the name of a tachometric dynamo.

Such an improved servo-control device exhibits the disadvantage of requiring expensive and bulky mechanical members fixed to the motor shaft, which furthermore upset the dynamic operation of the motor. Finally, the characteristics of tachometric dynamos or generators depend on ambient temperature, which impairs the stability of servo-control actions obtained. This is why, in particular when the motors are of the so-called "limited angular rotation" type, it is often preferred, instead of making use of a separate generator in order to produce a signal proportional to the rotational speed of the motor, to use an electrical signal which exists in all direct-current motors, namely a voltage appearing across the terminals of the motor under the direct effect of its rotation, and proportional to its rotational speed. For the sake of simplicity, this voltage will hereinafter be designated by the name of the tachometric voltage of the rotor.

Although this voltage may be exploited in various ways in order to produce a servo-control signal, it is used, in accordance with a known solution, in opposition to other voltages, in a bridge circuit whereof the motor to be servo-controlled occupies one of the branches. If the bridge is exactly balanced when the motor is stationary, rotation of the latter sets up a tachometric rotor voltage which unbalances the bridge, and sets up the required tachometric correction signal across the terminals of one of its diagonals.

Nevertheless, one of the problems of optimum operation of the device is linked to its sensitivity to temperature variations. In order that this operation shall remain correct over a wide range of temperatures, at least those of the elements of the bridge upon which its balance depends, must have characteristics which vary in accordance with the same law as a function of temperature. It is a main feature of the invention to provide a solution to this problem by an advantageous form of embodiment of the resistance of the electrical bridge associated with the motor to be servo-controlled.

According to the invention, there is provided a tachometric measuring device for a direct-current motor equipped with a stator and a rotor, taking the form of a two-branch impedance bridge, the motor being inserted into one branch, said bridge having two diagonals, the electrical power feeding the motor being applied across the ends of one, and the electrical signal linked to the speed being available across the ends of the other, wherein, in the branch comprising the motor, the impedance associated with it in the bridge consists, at least partly, of a non-inductive winding in thermal contact with the motor.

The invention will be better understood with the aid of the following description, with reference to the appended Figures, wherein:

FIG. 1 illustrates a schematic diagram of a device for servo-controlling position and speed according to known art, comprising a tachometric generator;

FIGS. 2 and 3 illustrate schematic diagrams of bridge-circuit servo-control devices of known type;

FIGS. 4, 5 and 6 illustrate three forms of embodiment according to the invention of a resistance for a bridge circuit.

FIG. 1 illustrates a schematic diagram of the whole of a positional servo-control device of known type for direct-current motors M. This motor is usually of the so-called "limited angular rotation" type; in such a case, the rotor rotates between two given angular limits, which dispenses with the need for feeding its windings by a device of the commutator-and-brush type. In this device, the motor M is fed by an amplifier A, to the input of which is applied a control signal corresponding to the desired angular position of the rotor. An angular-position pick-up C is fixed to the rotational spindle of the motor, and provides a positional signal which is applied at 2 to the input of the amplifier A.

The motor rotates until the two signals applied to the terminals 1 and 2 are equal in magnitude and opposite in sign. Positional servo-control is certainly obtained but, as already indicated above, there is the risk of the inertia of the moving parts introducing a certain amount of instability into the position thus obtained; a tachometric generator G delivering at the terminal 3 a signal proportional to the rotational speed of the motor is then usually fixed to the spindle of the latter. Under the same conditions as for the positional signal, the tachometric signal is applied simultaneously with the servo-controlled positional signal emanating from the pick-up C to the input of the amplifier A feeding the motor. An element for adjusting the phase $C_p$ is usually inserted here. Thus the position of the rotor is servo-controlled simultaneously with tachometric correction of the error due to the speed inertia delay. Nevertheless, as already explained above, this is a complicated, bulky and expensive solution, and in addition the characteristics of tachometric generators depend to a large extent on ambient temperature.

FIG. 2 illustrates a schematic diagram of the bridge-circuit positional servo-control device according to the invention, the bridge comprising 4 arms grouped in two branches.

The generator G of FIG. 1 is replaced by the circuit G'. The motor M, having a resistance of Rm, is inserted into one of the arms PX of one the branches of the bridge, the other arm of this branch XQ comprising a resistive element Ra; the other branch of the bridge comprises a resistance R1 in the arm PY, and a resistance R2 is its other arm. It is then known that according to the general laws governing bridge circuits, the bridge is "in balance" if the following simple relationship is satisfied:

$$R1/R2 = Rm/Ra$$

In this case, when an electrical voltage is applied across the terminals of the diagonal PQ of the bridge no voltage is derived across the terminals of the other diagonal XY.

When the motor M resumes rotating, an electrical voltage proportional to the speed is set up there, and this "tachometric" voltage unbalances the bridge; there then appears across the terminals XY a voltage which is applied to the terminals of a differential amplifier D 16, at the output of which is available an electrical signal representing the speed-correction signal capable of being applied via the phase-corrector element Cp to the terminal 3 of the circuit of FIG. 1.

In FIG. 2 a self-inductance La, having the purpose of compensating, in the bridge balance, for the self-inductance Lm of the motor, has been inserted in series with the resistance Ra.

FIG. 3 illustrates a variant of embodiment of the servo-control device of FIG. 2. This variant eliminated, from the bridge circuit, the inductance La which provided compensation for the back-electromotive force induced by the current variation into the inductance Lm of the motor, and whereof the function was to provide the equality $$La/Ra = Lm/Rm$$

This solution is, in fact critical in use, since it requires a good knowledge of the inductance Lm, and the construction of a group of components Ra La adapted to each motor.

According to the variant of FIG. 3, the undesirable signal Lm di/dt is eliminated by a filter Z.

The cut-off frequency of this filter, which is of the "low-pass" type, must be equal to, or greater than, the frequency corresponding to the maximum angular velocity of the motor when the positional servo-control is in operation, but on the other hand, must be lower than the frequency corresponding to the cut-off frequency of the control amplifier, a double condition which is easy to satisfy, since this latter frequency is much higher. Under these conditions, it should be noted that the bridge circuit comprises, besides the motor itself, only three purely resistive components which are not costly.

FIG. 4 illustrates a form of embodiment, which is characteristic of the tachometric measuring device, of the resistance of the bridge circuit associated with the motor in one of the branches of this bridge.

In fact, keeping a bridge in balance as a function of temperature requires that the values of all similar elements shall vary in accordance with ratios of the same order of magnitude. It follows from this that since the resistance Rm of the motor is essentially variable with temperature the resistance Ra of the bridge associated with it must exhibit proportional variations, which leads to keeping the latter resistance at the same temperature as the motor.

An advantageous solution, which ensures the best thermal contact, resides in fixing this resistance directly to the motor.

It is in addition particularly indicated, in order to obtain the same law of thermal variation of resistivity, to make the resistance of the same material as the windings of the motor, that is to say usually of copper. The resistance made up then takes the form of a winding of copper wound directly on to the body of the motor. However, such a form may then involve the appearance of a plurality of detrimental phenomena.

The first is linked to the proximity itself of the motor, which radiates an external alternating magnetic field, a parasitic field which is due both to the stator windings such as T and to the magnet D of the rotor. The lines of force such as H are orientated parallel to the magnetic toroid T formed by the stator.

FIG. 4 illustrates a form of embodiment which does not comprise this detrimental phenomenon.

For this purpose, and according to a feature of the invention, the resistance is made in the form of a winding wound directly on to the cylindrical body T of the motor, but with the direction of each turn, as illustrated in FIG. 4, parallel to that of the lines of force of the external magnetic field in which it is immersed.

With such a relative orientation, no voltage can be induced by the motor into the winding. It should nevertheless be noted that the winding thus embodied on a ferromagnetic core exhibits a certain amount of self-inductance.

According to a feature of the invention, use is made of the self-inductance thus obtained, whereof the value may be chosen independently of the resistance, in order to constitute the self-inductance La necessary to embody the bridge circuit comprising impedances described in FIG. 2.

FIG. 5 illustrates a variant of embodiment of the resistance according to the invention, when either the maximum frequency of the alternating magnetic field, or the resistance to be obtained, exceeds a certain value. In this case, the self-inductance L of the winding constituting the resistance, takes a value which is moreover appreciable in consequence of the presence of the ferromagnetic core, and may produce at high frequencies a parasitic impedance of sufficient value to disturb the balance of the bridge, and even make it difficult to balance. In this case, as illustrated in FIG. 5, the winding is made up of a group of two windings 50 and 51 connected in series with their respective directions of winding opposite in sign, so that the whole winding has no inductance.

FIG. 6 illustrates a particularly advantageous variant of embodiment of the winding of FIG. 5. This variant makes use of the winding process often designated by the name of winding "with two wires in hand". The embodiment 52 of this is carried out simultaneously with two insulated wires connected together at one end, the other two ends being connected to the input and output terminals of the winding. The magnetic flux passing through a given turn is effectively compensated for by that which passes through the adjacent complementary turn in the opposite direction. It should be noted that, when the resistance is embodied in accordance with this process comprising two windings in opposite directions the effect of the magnetic fields radiated by the motor causes voltages to be induced in opposition into the two windings; in this case, the requirement for the turns and the lines of force of the parasitic magnetic fields to be parallel to one another is less strict, and results in easier industrial embodiment.

The tachometric measuring device according to the invention thus leads, by way of a particular industrial product, to an electric motor comprising a winding fixed to it and directly embodied at the time of manufacture, enabling this winding to be easily adapted and accurately adjusted, geometrically and electrically, on the motor, without any need for subsequent work when it is incorporated into the servo-control device.

Although the description of the invention has been given for a limited angular clearance motor, the field in which the invention is applicable extends, with any modifications which may be necessary and which will be known to the man skilled in the art, to all direct-current motors whereof the characteristics enable them to be controlled by a servo-controlled amplifier.

What is claimed is:

1. In a tachometric measuring device for a direct-current motor equipped with a stator and a rotor, taking the form of an impedance bridge circuit having two branches, the motor being inserted into one branch, said bridge comprising two diagonals, the electrical energy feeding the motor being applied across the ends of one of the diagonals, and the electrical signal representing the speed of the motor being available across the ends of the other diagonal, the impedance in the branch comprising the motor, including a continuous resistive non-inductive winding in thermal contact with the motor, said winding being wound directly on the exterior side stator of the motor.

2. Measuring device according to claim 1, wherein said winding takes the form of a winding in two halves disposed side-by-side in opposite directions of winding and connected in series.

3. Measuring device according to claim 2, wherein said halves of the winding are overlapped, the turns of each half being respectively disposed two-by-two and side-by-side, in the arrangement called "with two wires in hand".

4. Measuring device according to claim 1, wherein said winding takes the form of a winding wherein the plane of each turn is merged with the plane containing the lines of force of the magnetic field of the motor prevailing in the vicinity of said turn.

5. Measuring device according to claim 1, wherein said winding is wound directly on to the stator of the motor.

6. Measuring device according to claim 5, wherein said winding is provided with a predetermined value of self-inductance.

7. Measuring device according to claim 1, wherein said winding is made of the same material as the electrically conductive parts of the motor.

8. Direct-current electric motor, equipped with a non-inductive winding according to claim 1.

* * * * *